Nov. 19, 1968     R. GAGLIARDI     3,411,346
APPARATUS FOR SUPPORTING AND TESTING VEHICLE WHEELS
Filed Aug. 16, 1965     2 Sheets-Sheet 1

INVENTOR
ROMANO GAGLIARDI
BY *Young + Thompson*
ATTORNEYS

Nov. 19, 1968 R. GAGLIARDI 3,411,346
APPARATUS FOR SUPPORTING AND TESTING VEHICLE WHEELS
Filed Aug. 16, 1965 2 Sheets-Sheet 2

INVENTOR
ROMANO GAGLIARDI
BY Young + Thompson
ATTORNEYS

United States Patent Office 3,411,346
Patented Nov. 19, 1968

3,411,346
APPARATUS FOR SUPPORTING AND TESTING VEHICLE WHEELS
Romano Gagliardi, Lugano, Switzerland, assignor to R.A.P. Rollen Automobil Patent Anstalt, Vaduz, Liechtenstein
Filed Aug. 16, 1965, Ser. No. 479,855
Claims priority, application Switzerland, Aug. 25, 1964, 11,192/64; Jan. 28, 1965, 1,216/65
4 Claims. (Cl. 73—117)

ABSTRACT OF THE DISCLOSURE

Apparatus for supporting vehicle wheels for test purposes comprises a portable frame carrying a pair of generally horizontal rotatable rolls. Means are provided for changing the orientation of the axis of one roll with respect to the axis of the other roll of the pair. Ramps are provided for enabling vehicle wheels to mount the rolls, and means are provided for measuring the angular velocity of at least one of the rolls and for braking the rotation of at least one of the rolls. The rolls of a pair can be oppositely inclined at small acute angles to the horizontal for centering the supported wheel, and the axes of the rolls can also be inclined in a horizontal plane. Two such portable frames can be secured together by parallel rods at the front and rear of the frames.

---

The present invention relates to an apparatus for use (1) For driving schools, in order that a trainee may acquire knowledge and mastery over controls of the stationary car, all the parts of which are operable, and without modifying the car itself;

(2) For motor testing and adjustment in car shops, driving on the road being unnecessary, the car being stationary but with all the parts thereof, motor included, operable at any desired speed;

(3) For inspection and adjustment of the various body parts of the stationary car the parts of which are operable and by simulating an uneven road through offset vibrations imparted to roller axes, or the like.

According to the invention, said apparatus is characterized by at least one pair of rolling or return members capable of supporting each driving wheel of the car during operation thereof, said members being in turn supported by supports provided with means allowing a mutual orientation, elevation and spacing, as well as a correct arrangement relative to the driving wheel axis of the car, in addition, said members being connected to control devices for angular velocity and braking thereof in order to control and reproduce running, acceleration, vibration and vibration measurement conditions in the various car parts.

The appended drawings show some preferred embodiments of the apparatus comprising the invention.

Figure 1:
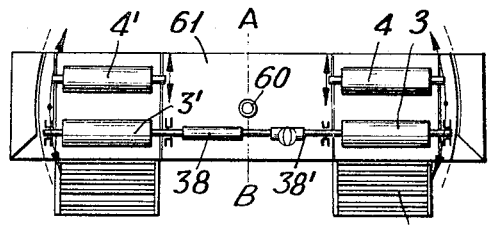
FIGURE 1 is a plan view of one embodiment of apparatus according to the present invention.
Figure 2:
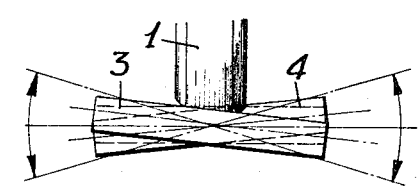
FIGURE 2 is an elevational view taken parallel to the line A–B in FIGURE 1, showing the X-shaped arrangement of the rollers relative to each other.

Referring now to the drawings in greater detail, and first to the embodiment of FIGURES 1 and 2, there is shown apparatus according to the invention, in which the driving wheels 1 of an automobile or other vehicle to be tested are supported by two rollers 3, 4 individually rotatable about horizontal axes and mounted for rotation in suitable bearings. Inclined ramps 7, 8 permit the wheels of the vehicle to roll up onto the rollers 3, 4 of one set and 3', 4' of the other set.

In FIGURES 1 and 2, the pairs of rollers 3–4 and 3–4' are in an X arrangement having the axes thereof converging to the center of the rollers, as best seen in FIGURE 2, said arrangement allowing the automatic centering of the car driving wheels and preventing car wheels from side skidding and exiting from the apparatus during testing.

As a matter of fact, side skidding is a remarkable drawback of the known type of fixed roller testing apparatus, that is apparatus free of adjusting means for the rollers. Side skidding is due to the fact that very seldom a car climbs the rollers keeping the longitudinal axis thereof at right angles to the roller axis. This causes continuous vibration preventing a correct measurement and reading of accompanying meters during testing. Apparatus of FIGURE 1 overcomes such a drawback both due to the fact of being preferably orientable so that it can be disposed with the median axis A–B perfectly coincident with the longitudinal axis of the car, and because the X-arranged rollers cause the car driving wheels to stay at the center of the rollers. Rollers 3, 4 and 3', 4' are mounted on a revolving platform 61 rotatable by means of a pivot pin 60 allowing the correct axial orientation of the apparatus and rollers with respect to the body axis and therefore to the car driving wheels.

Then, the presence of ramp 7, that can be urged under the car, in addition to causing a considerable decrease of the space required for testing operations, as already stated, facilitates the correct alignment arrangement with the car.

Figure 3:
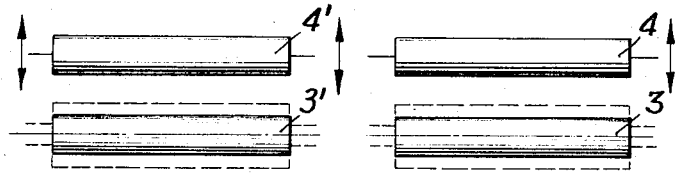
FIGURE 3 is a diagrammatic plan view of two pairs of rollers, indicating one mode of adjustability relative to each other.

A further expedient is that shown in FIGURE 3, according to which rear rollers 4–4' are removable and approachable in the horizontal plane relative to front rollers 3–3' so as to fit them to the driving wheel diameter.

Figure 4:
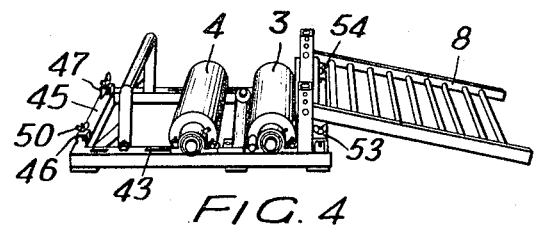
FIGURE 4 is a perspective view of a modified form of the invention, showing the support for a single wheel.
Figure 5:
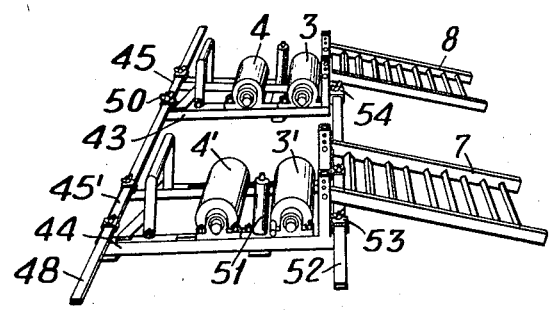
FIGURE 5 is a view of the embodiment of FIGURE 4 but showing two subassemblies interconnected for supporting both of the wheels on an axle of a vehicle.

In FIGURES 4 and 5 there is shown a further variant. In this case, the pair of rollers 3–4 is separated from the pair of rollers 3'–4' and each pair (FIGURE 4) is provided with a support frame 43 (respectively 44) and ramp 8 (respectively 7).

Front portions 45 and 45' of each apparatus are provided with brackets 46–47 within which two common rods 48 and 52 are received (FIGURE 5), said rods determining and maintaining parallelism between the two elements of the apparatus and allowing alignment with the car.

Fastening of the two subassemblies at the correct mutual distance is by means of wing nuts 50.

Should the two pairs of rollers not be aligned by means of the rods 48 and 52, it would be possible to bias axes thereof (always in the horizontal plane), so that they converge at a fore or back position, that is a position for instance on the center line of rod 48 or on the center line of rod 52. This serves to maintain the car driving wheels centered.

Figure 7:
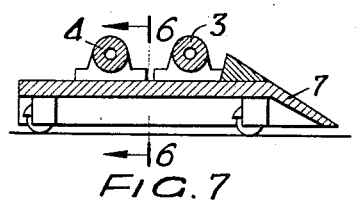
FIGURE 7 is a cross-sectional view taken on the line 7—7 of FIGURE 6.
Figure 6:
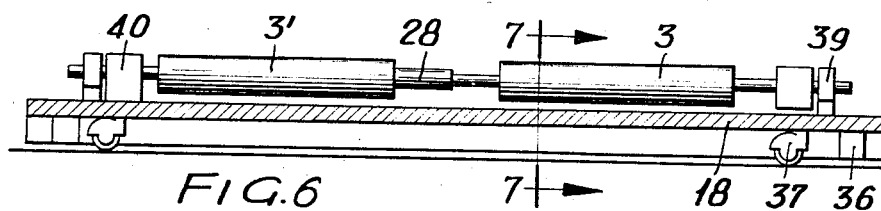
FIGURE 6 is an elevational view parallel to the longitudinal axis of the vehicle, showing a further modified form of the invention.

The apparatus of FIGURES 6 and 7 comprises the support frame 18 provided with fixed legs 36 and retractable and castor articulated legs 37 in order that transport be facilitated.

On frame 18 there are arranged two pairs of rollers 3, 4 and 3', 4', one of which is suitable to support a driving wheel of the car and the other to support the other driving wheel.

Front rollers 3, 3' are interconnected by a cardan and telescopic joint 38 and 38' to allow mutual removal and approach of pairs 3, 4 and 3', 4' in order to accomodate the same to the distance between each wheel of the car (gauge).

To the end of a pair of rollers the revolution indicator 39 is secured, said indicator allowing measurement of angular roller velocity to be taken, whereas at the other end there is attached a hydrodynamic brake 40, or a brake of another type, allowing braking of rollers 3, 3' caused to rotate by car driving wheels, in order that the car be subjected to a load defined for the various running conditions during testing.

In FIGURE 7, there is seen the ramp 7 allowing the apparatus to be engaged, that is fitted, directly under the car driving wheels, in order that the car be prevented from effecting a significant displacement on transferring onto the rollers, and this in view of limiting as far as possible space required for such operations, as the area available in car shops and driving schools is limited. Of course, the apparatus may be used also outside the shop.

Other variants are possible, consistent with what is hereinafter claimed, and therefore within the patent protection scope.

I claim:

1. Apparatus for supporting vehicle wheels for test purposes, comprising a portable frame, a pair of generally horizontal rolls mounted for rotation on the frame, said rolls being oppositely inclined at small acute angles to the horizontal in X arrangement as viewed parallel to the axis of the vehicle to keep the vehicle wheel in a centered condition.

2. Apparatus for supporting vehicle wheels for test purposes, comprising a portable frame, two pairs of generally horizontal rolls mounted for rotation on the frame, and means interconnecting said two pairs of rolls, the axes of the rolls of each pair being inclined in a horizontal plane so that they converge with the axes of the rolls of the other pair.

3. Apparatus for supporting vehicle wheels for test purposes, comprising two portable frames, a pair of generally horizontal rolls mounted for rotation on each frame, a ramp connected to each frame for conducting a vehicle wheel to its pair of rolls, and a pair of parallel rods one of which is secured to the forward portion of both said frames and the other of which is secured to the rear portion of both said frames thereby to keep said frames in alignment and in parallelism with each other.

4. Apparatus as claimed in claim 3, and means detachably securing said rods to said frames.

References Cited

UNITED STATES PATENTS

| | | | |
|---|---|---|---|
| 3,187,440 | 6/1965 | Merrill et al. | 33—203.13 |
| 1,650,504 | 11/1927 | Frost | 73—117 |
| 1,882,356 | 10/1932 | Cowdrey | 73—124 |
| 2,091,154 | 8/1937 | Matzner | 35—11 |
| 2,148,828 | 2/1939 | Myers | 35—11 X |
| 2,702,432 | 2/1955 | Martin | 73—117 X |
| 3,305,935 | 2/1967 | Cady et al. | 73—126 X |

FOREIGN PATENTS

| | | |
|---|---|---|
| 991,842 | 5/1965 | Great Britain. |
| 343,718 | 10/1904 | France. |
| 620,703 | 4/1927 | France. |
| 605,814 | 11/1934 | Germany. |
| 41,116 | 6/1937 | Netherlands. |

RICHARD C. QUEISSER, *Primary Examiner.*

JERRY W. MYRACLE, *Assistant Examiner.*